Sept. 5, 1950 G. CANTOR 2,520,907
AMPLIFIER
Filed March 5, 1945
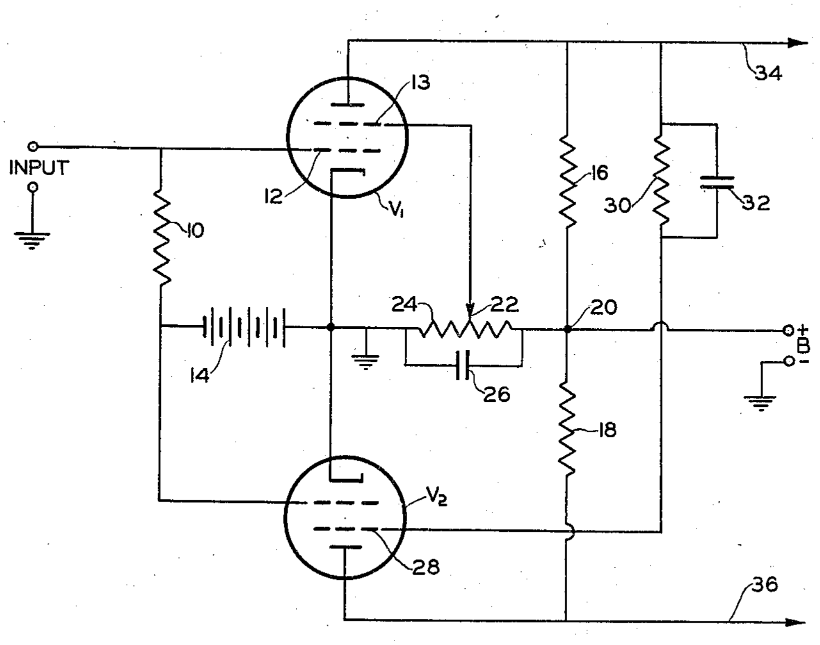
INVENTOR.
GILBERT CANTOR
BY
William D. Hall
ATTORNEY Patented Sept. 5, 1950 2,520,907

UNITED STATES PATENT OFFICE 2,520,907

AMPLIFIER

Gilbert Cantor, Bradley Beach, N. J.

Application March 5, 1945, Serial No. 581,014

5 Claims. (Cl. 179—171)

(Granted under the act of March 3, 1883, as amended April 30, 1928; 370 O. G. 757)

The invention described herein may be manufactured and used by or for the Government for governmental purposes, without the payment to me of any royalty thereon.

This invention relates, generally, to push-pull amplifiers. More particularly, it relates to a push-pull video amplifier of the phase inverter type having a balanced direct-current-coupled output circuit which can, for instance, be directly connected to the deflecting plates of an oscilloscope.

Prior methods of obtaining a push-pull output by means of a phase inverter stage involve a pair of tubes, one tube being connected to the signal source to provide an output of one phase. A connection is made across a portion of the output circuit of said one tube to the input grid of the second tube, which provides an output of opposite phase. In order to isolate the direct current plate potential of the first tube from the grid of the second tube, a blocking condenser is interposed in said connection. For a disclosure of a typical circuit of this type, reference is made to "Ultra High Frequency Techniques," by Brainerd, et al., page 100, published 1942 by D. Van Nostrand Co., Inc.

However, where a D.-C.-coupled output circuit is desired, such blocking condensers cannot be used. Of course, it is possible to make an equivalent D.-C.-coupled phase inverter by eliminating the blocking condenser, bringing the cathode of the second tube up to the potential of the plate source of the first tube, and using two separate plate and filament supplies; or by using two separate filament supplies and a total plate supply voltage equal to twice that which is normally required. But these expedients are cumbersome, expensive, and not suitable where there is desired a balanced output across a D.-C.-coupled, common, center-tapped resistor.

It is, therefore, a principal object of this invention to provide a simple amplifier having a direct-current-coupled, balanced output circuit which does not have the disadvantages above mentioned.

It is a further object of this invention to provide an amplifier of the phase-inverter type which has a balanced direct-current-coupled output circuit and using a single plate and cathode supply.

In accordance with this invention, two like multigrid tubes are used. The input signal is applied to the first grid of one tube. The output of this tube is now applied to a higher potential grid of the second tube, preferably the screen grid thereof. A center-tapped resistive load circuit is connected from the plate of one tube to the plate of the other, the plate potential being applied to the center tap. The two end terminals of said load circuit supply the balanced output voltages having opposite phases with respect to said center tap. Since the potential of the screen grid of the second tube is already near the potential of the plate of the first tube, additional biasing sources are not necessary, as is the case with prior methods.

For a better understanding of the invention, together with other and further objects thereof, reference is had to the following description taken in connection with the accompanying drawing, which shows a schematic circuit of the invention.

The amplifier comprises a pair of multigrid electron tubes V1 and V2 each having at least an input grid and a screen grid. The input signal is impressed across a high resistance 10, which is connected between the cathode and input grid 12 of V1. Grid bias for both tubes is supplied by a source 14, as shown.

The plates of tubes V1 and V2 are respectively connected to like load resistors 16 and 18, the B-supply for said tubes being connected to the junction 20 of said resistors, thus forming a balanced load circuit, the electrical center of which is at point 20. Potential for screen grid 13 of tube V1 is obtained from an adjustable slider 22 of a potentiometer 24 connected across the B-supply. A filter condenser 26 is shunted across potentiometer 24. Potential for screen grid 28 of V2 is supplied by the B-supply source, through load resistor 16 and resistor 30 in series.

In operation, the signal is applied to grid 12 of tube V1, and the amplified output thereof appears across load resistor 16. One output voltage is therefore taken off lead 34. This output voltage is also impressed, through voltage dropping resistor 30, on the screen grid 28 of V2, which is at a much higher reference potential than input grid 12 of V1. The amplified output of tube V2 appears across load resistor 18 and is taken off lead 36. Because of the phase inversion in tube V2, the voltages across load resistors 16 and 18, respectively, and hence at leads 34 and 36, vary in opposite phase with respect to ground, which is at the electrical center of the output circuit. Although a much higher signal voltage is applied to V2 than to V1, the mutual conductance of V2 is much lower than that of V1, since said signal is applied to the screen grid which has less controlling effect than the input grid. Hence, the outputs of both tubes are substantially alike.

Where a wide range of frequencies are to be amplified, a condenser 32 may be shunted across resistor 30 in order to compensate for any possible inductance in resistor 30, which tends to attenuate the high frequency components.

The adjustable screen voltage potentiometer 22 is provided to permit adjustment of voltage on screen grid 13 of V1 so that slight unbalances in the two tubes and their circuits can be compensated for. Similar results can be accomplished by providing different biases on the first grids of tubes V1 and V2, respectively, or by other well known means.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

I claim:

1. A push-pull signal-translating circuit comprising first and second electron tubes, each having at least a cathode, two grids spaced at different distances from said cathode, and an output electrode, means to negatively bias the first grids of both tubes at a like potential, means to positively bias the second grids of both tubes, means to impress a potential to be amplified upon the first grid of only the first tube, a balanced resistive load circuit comprising a pair of like load resistors, one end of one resistor being connected to the output electrode of one tube, one end of the other resistor being connected to the output electrode of the other tube, the other ends of said resistors being joined and connected to a source of space-current potential, and a resistance and condenser shunted thereacross connected between a point on the load resistor of said first tube to the second grid of said second tube, said load resistors being adapted to be connected to an external circuit by a direct-current connection.

2. A balanced, push-pull video amplifier comprising first and second electron tubes, each having at least an anode, control grid and screen grid, means to negatively bias the control grids of both tubes at a like potential, means to impress positive potentials, at least one of which is adjustable, on said screen grids, means to impress a potential to be amplified upon the control grid of only the first tube, a balanced resistive load circuit comprising a pair of like load resistors, one end of one resistor being connected to the anode of one tube, one end of the other resistor being connected to the anode of the other tube, the other ends of said resistors being joined and connected to a source of space-current potential, and a resistance and condenser shunted thereacross connected between the anode of said first tube and the screen grid of said second tube, said anodes being adapted to be connected to an external circuit by a direct-current connection.

3. A push-pull signal-translating circuit comprising first and second electron tubes, each having at least a cathode, two grids spaced at different distances from said cathode, and an output electrode, means to maintain the first grids of both tubes at a like potential, means to positively bias the second grids of both tubes, means to impress a potential to be amplified upon the first grid of only the first tube, a balanced resistive load circuit comprising a pair of like load resistors, one end of one resistor being connected to the output electrode of one tube, one end of the other resistor being connected to the output electrode of the other tube, the other ends of said resistors being joined and connected to a source of space-current potential, and a resistance connected between a point of varying potential on the load resistor of only said first tube to the second grid of only said second tube, said load resistors being adapted to be connected to an external circuit by a direct-current connection.

4. A balanced, push-pull amplifier comprising first and second electron tubes, each having at least a cathode, an anode, and two grids spaced at different distances from said cathode, means to maintain the first grids of both tubes at a like potential, means to positively bias the second grids of both tubes, means to impress a potential to be amplified upon the control grid of only the first tube, a balanced resistive load circuit comprising a pair of like load resistors, one end of one resistor being connected to the anode of one tube, one end of the other resistor being connected to the anode of the other tube, the other ends of said resistors being joined and connected to a source of space-current potential, and a resistance connected between the anode of said first tube and the second grid of said second tube, said anodes being adapted to be connected to an external circuit by a direct-current connection.

5. A balanced, push-pull amplifier comprising first and second electron tubes, each having at least an anode, control grid and screen grid, means to maintain the control grids of both tubes at a like potential, means to impress positive potentials on said screen grids, means to impress a potential to be amplified upon the control grid of only the first tube, a balanced resistive load circuit comprising a pair of like load resistors, one end of one resistor being connected to the anode of one tube, one end of the other resistor being connected to the anode of the other tube, the other ends of said resistors being joined and connected to a source of space-current potential, and a resistance connected between the anode of said first tube and the screen grid of said second tube, said anodes being adapted to be connected to an external circuit by a direct-current connection.

GILBERT CANTOR.

REFERENCES CITED

The following references are of record in the file of this patent:

UNITED STATES PATENTS

| Number | Name | Date |
|---|---|---|
| 1,953,775 | Robinson | Apr. 3, 1934 |
| 2,050,059 | Koch | Aug. 4, 1936 |
| 2,208,254 | Geohegan | July 16, 1940 |
| 2,264,197 | Hadfield | Nov. 25, 1941 |
| 2,289,301 | Barber | July 7, 1942 |
| 2,322,528 | Lewis | June 22, 1943 |

FOREIGN PATENTS

| Number | Country | Date |
|---|---|---|
| 105,310 | Australia | 1938 |